United States Patent Office 3,401,469
Patented Sept. 17, 1968

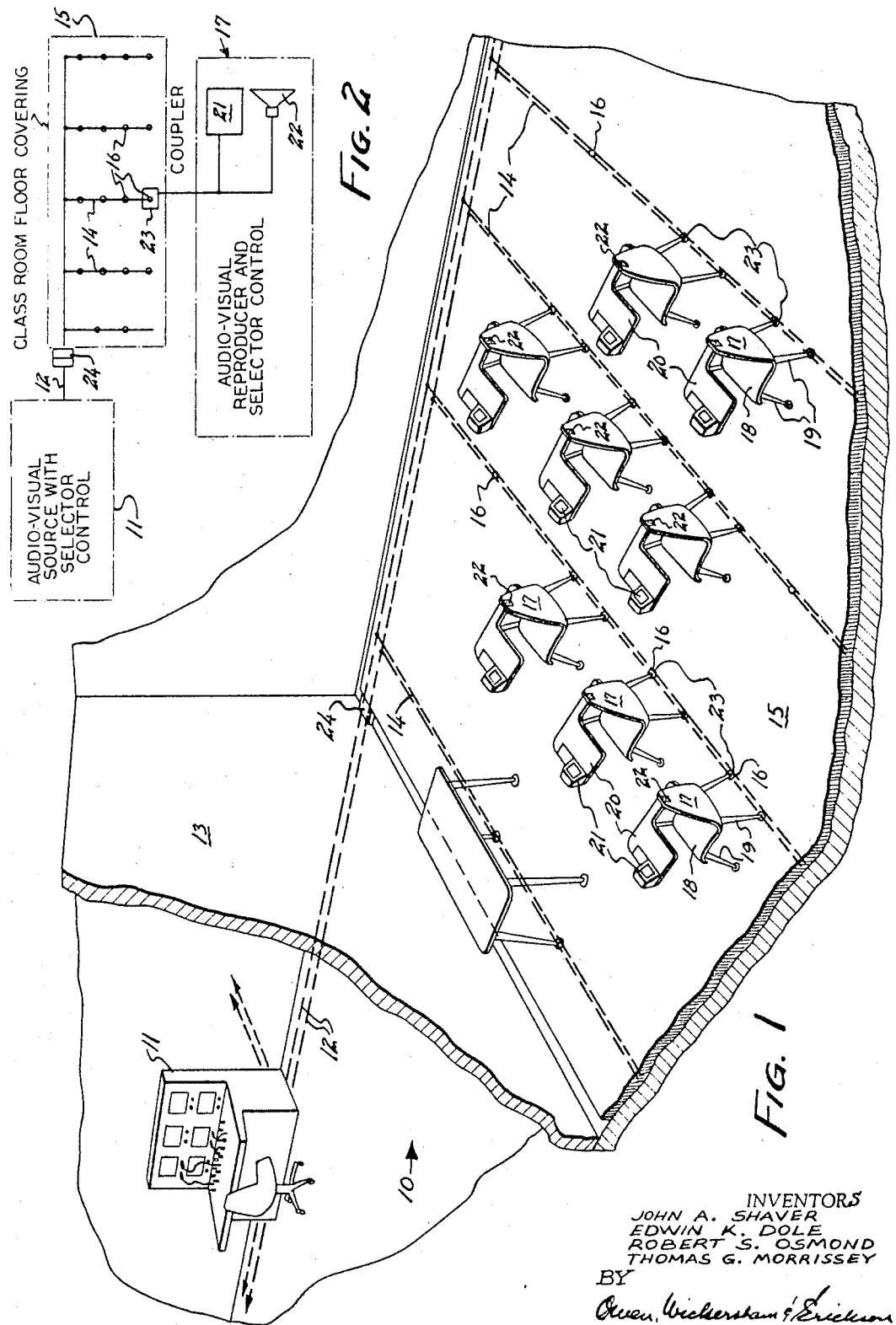

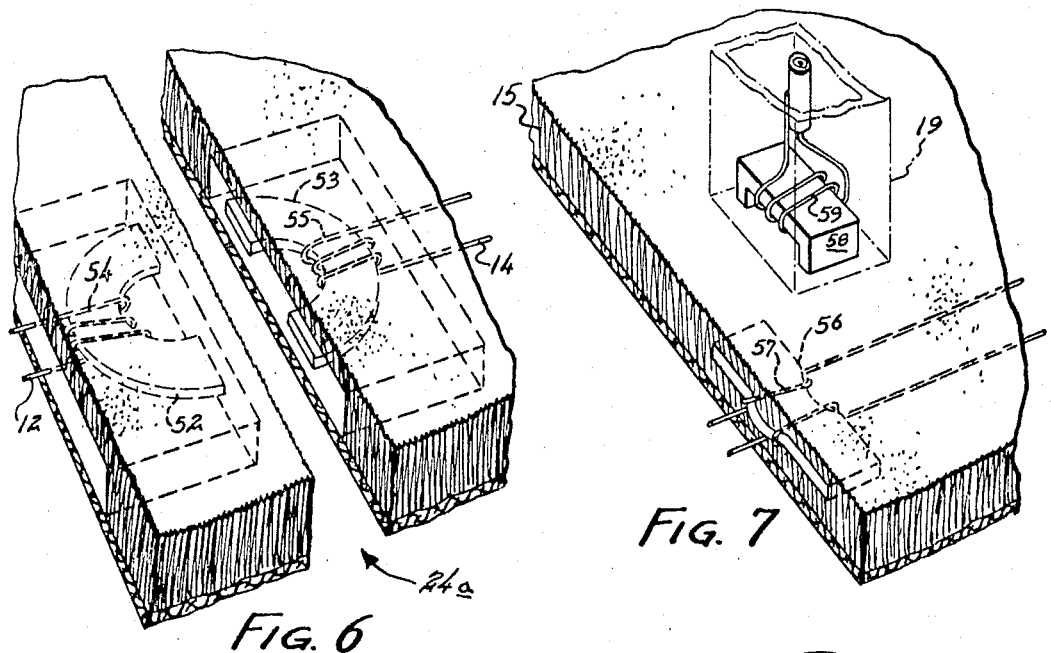
FIG. 6
FIG. 7
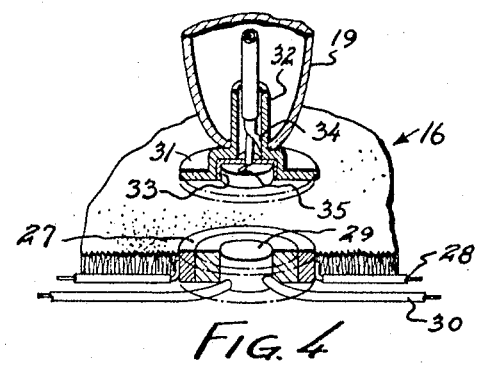
FIG. 4
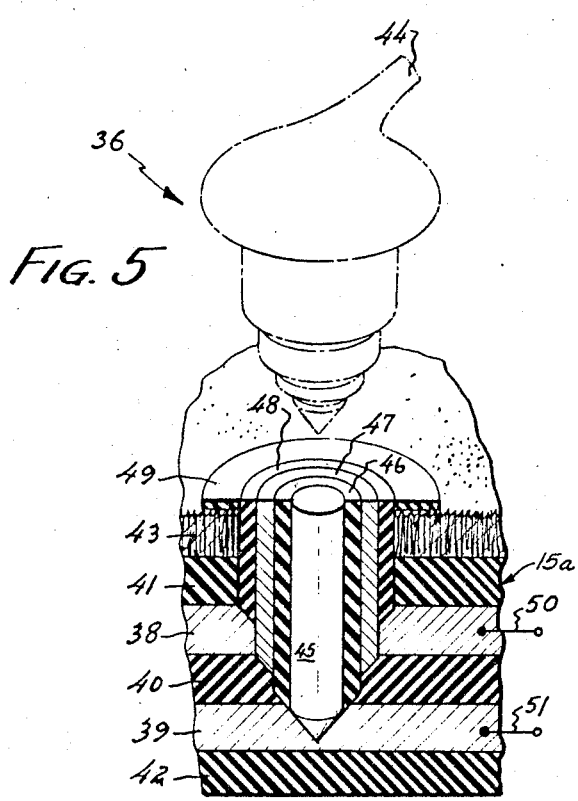
FIG. 5
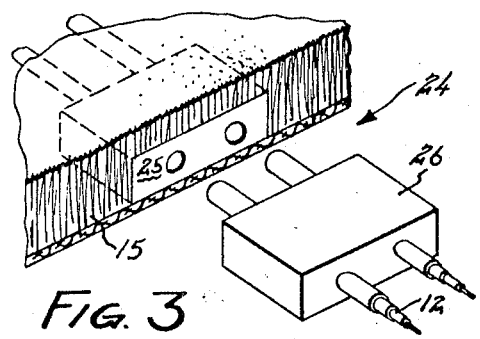
FIG. 3
INVENTORS
JOHN A. SHAVER
EDWIN K. DOLE
ROBERT S. OSMOND
THOMAS G. MORRISSEY
BY
Owen, Wickersham & Erickson
ATTYS.

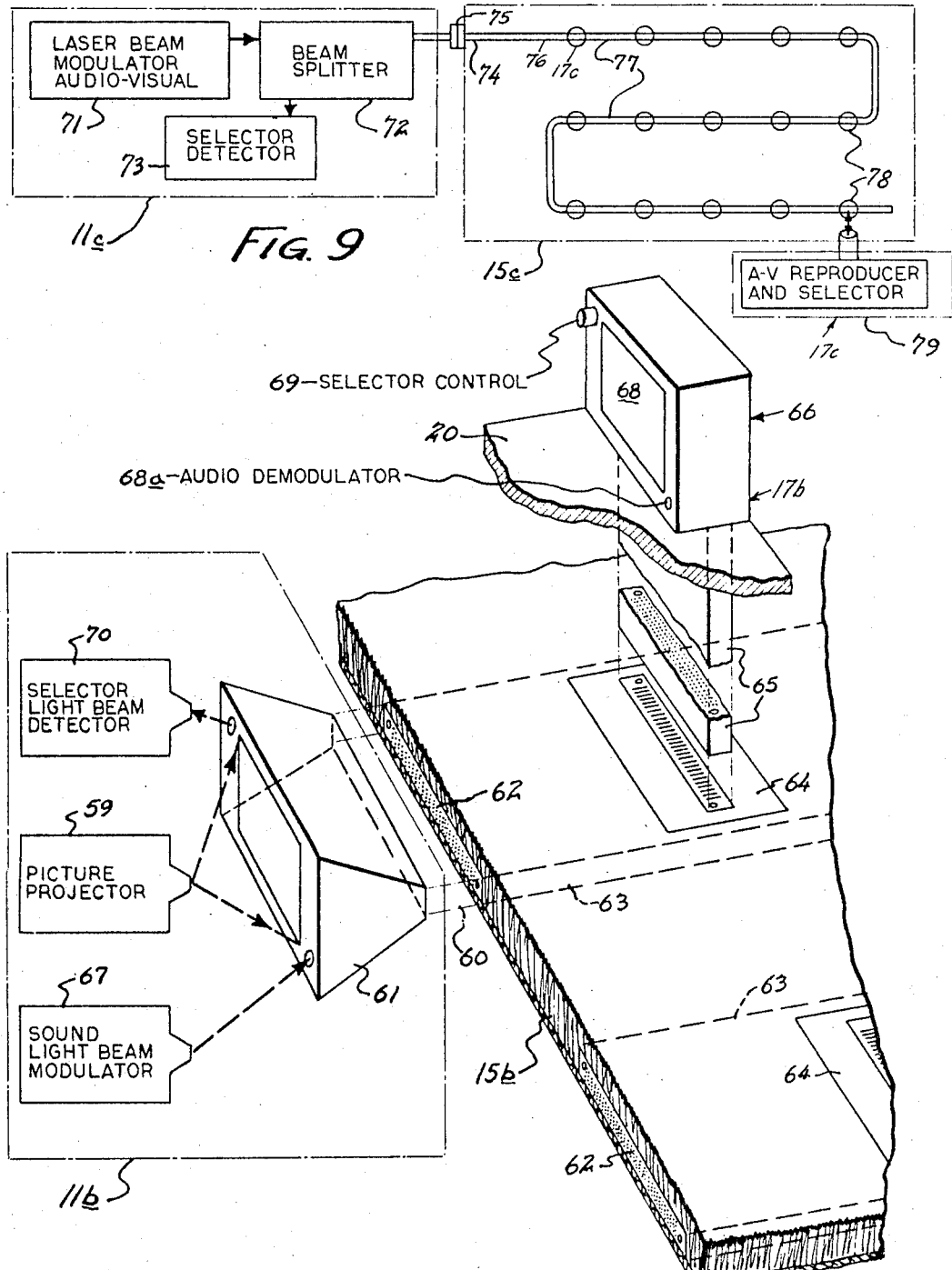

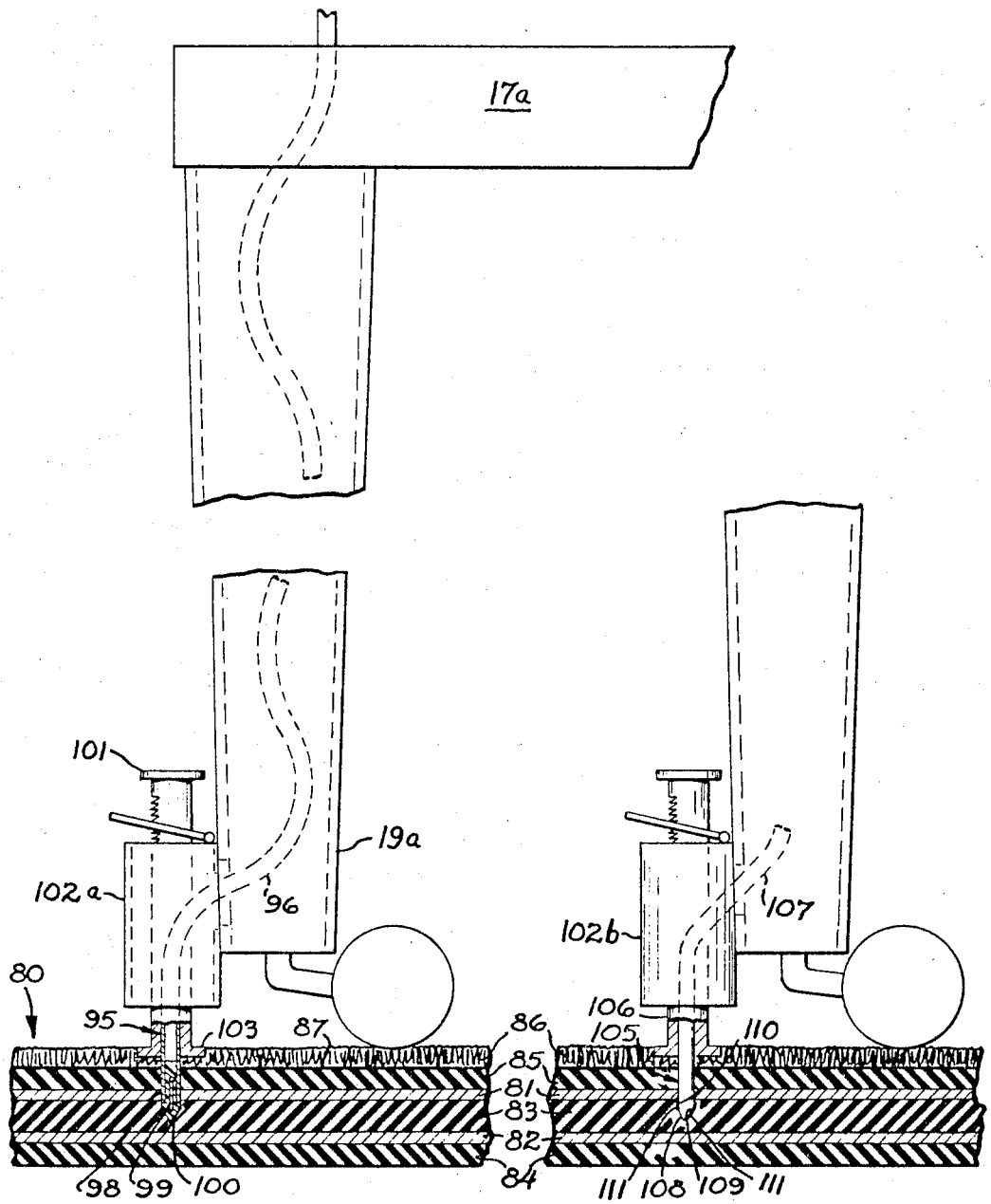

3,401,469
EDUCATIONAL SYSTEM WITH MOBILE STUDENT LEARNING STATIONS
John A. Shaver, 405 E. Park Lane, Salina, Kans. 67401;
Edwin K. Dole, 3505 Kersey Lane, Sacramento, Calif.
95825; Robert S. Osmond, 909 E. Minneapolis St.,
Salina, Kans. 67401; and Thomas G. Morrissey, 5700
W. 28th Ave., Denver, Colo. 80214
Continuation-in-part of application Ser. No. 493,345,
Oct. 6, 1965. This application Apr. 21, 1966, Ser.
No. 549,758
16 Claims. (Cl. 35—8)

ABSTRACT OF THE DISCLOSURE

A system for disseminating information, as in a school, from a central source to a plurality of receiving or learning stations. A central control station transmits one or more channels of audio and visual information signals to a room located remotely from the control station, a transmission means interconnecting the central control station and the remote room. In the room is a laminated floor covering having signal distribution means within the floor covering for carrying the information signals and also power and having input coupling means for conveying the information signals and power to the signal distribution means. A plurality of receiving stations are supported by and freely movable on the floor covering of the room, each receiving station having means for random coupling with the distribution means within the floor covering to receive information signals and power therefrom. On each receiving station is means for amplifying the information signals and for providing either audio or video reproduction thereof and also means of sending return signals back to the central office station, as, for example, to select the information signals desired to be received by the learning station. The signal distribution means may comprise a wave signal propagating layer of dielectric material separating two conductive layers within said floor covering; each receiving station then having a coupler probe for penetrating the floor covering and receiving signal energy within the dielectric layer. The transmission means may be a bundle of glasslike fibers; the floor covering then having a plurality of bundles of glasslike fibers and the learning stations each having an optical transformer-coupler for extracting and reproducing the audio and visual information from the distribution network and for transmitting selector signals back to the central control station. In such a system, the central control station may include means for generating a beam of high frequency coherent light waves and have a modulator for imposing both audio and visual signals on the beam being transmitted; each learning station having means for demodulating the signals on a received beam.

---

This application is a continuation-in-part of copending application Ser. No. 493,345 filed on Oct. 6, 1965, now abandoned.

This invention relates to an information dissemination or educational system for utilizing prepared audio-visual material and for supplying such material from a distribution control center to a plurality of individual student learning stations from which the desired information can be selected by means of a student controlled selector system. It also relates to a floor covering for carrying audio-visual signals in such a system.

In recent years teaching methods and techniques have undergone substantial changes and the trend has been to utilize a greater amount of automation including the use of prepared audio-visual aids and various teaching machines. It has been found that such aids and apparatus can increase the learning process if the appropriate material is presented to meet a student's individual needs and capabilities. Under the orthodox system of classroom teaching where a large number of students of varying abilities are exposed to the same teaching techniques and subject matter, individual attention is often not practical. As a result, the learning process is impaired for at least some of the students.

A general object of our invention is to provide an educational system that solves the aforesaid problem, and more particularly a system that can supply several channels of educational information simultaneously from a central distribution and control station to a plurality of students, with each student having the capability of selecting and receiving the particular channel of information from the control center that fits his needs. An important part of our system is the use of a plurality of student learning stations each of which supports and is controlled by a single student. These student's learning stations are equipped with both audio and video reproducers plus other mechanical teaching aids and a control device for selecting the particular information channel being transmitted from the central station.

Our educational system also is compatible with a recent trend in the design of schools for providing larger and more open teaching areas rather than the relatively small conventional sized classrooms. Such facilities provide greater permissiveness and flexibility in handling students and in applying various teaching techniques. To meet the requirements of such an arrangement our invention provides student learning stations that are completely mobile so that their audio-visual equipment will be operable even though they are moved to various locations within the large classroom areas.

Another more specific object of our invention is to provide an educational system that will feed audio-visual information generated at a central distribution station through a classroom floor surface or floor covering thereon and into a plurality of individual student learning stations which are movable to a multiplicity of locations on the floor or its covering. These student learning stations can thus be arranged in groups of various sizes within the same classroom. Each student learning station has its own video and audio reproducers as well as other automated teaching apparatus that may be used, and each has a control device for selecting any one of several channels of information available at the central distribution station. Each of our student learning stations is also provided with a pickup means so that it can be easily coupled to any one of a multiplicity of outlets of a distribution network that is embedded in the classroom floor or within a floor covering. This distribution network is coupled to the central distribution or signal generating station.

Another object of the present invention is to provide a flexible floor covering comprising as part of its internal structure an electrical distribution network having a multiplicity of outlets each capable of being coupled to a student learning station so that audio-visual signal information can be transmitted through the floor covering and into the audio visual reproducers of the student learning station.

Another object of the present invention is to provide a carpet for use in classrooms capable of receiving audio-visual signals from a central signal generating source applied at an input coupler and of transmitting such signals through a plurality of outlets in the carpet to movable receiver devices such as mobile student learning stations supported thereon.

Still another object of our invention is to provide a carpet or floor covering for use in carrying audio-visual signals wherein the signal outlets adapted to cooperate with coupling means on a student learning station are embedded completely within the floor covering and are not visible on the surface thereof. In one embodiment of our invention such a carpet may be provided with a surface design indicating the location of signal outlets that are buried within the carpet or floor covering.

Yet another object of our invention is to provide an educational system where audio-visual information is generated and transmitted from a central control station through a transmission media utilizing the optical characteristics of bundled light transmitting fibers which may be woven into the structure comprising the floor covering.

Another object of our invention is to provide a laminated floor covering having a layer serving as a transmission medium between two conductive layers and adapted to provide audio-video transmission for any receiving units placed on the floor covering having appropriate coupling means.

Another object of our invention is to provide a system for transmitting multi-channel microwave signals into and through the aforesaid laminated floor covering and including movable receiving units on the floor covering with appropriate coupling means and demodulator means for reproducing microwave signals in either audio or video form.

A still further object of our invention is to provide an educational system wherein information is originated at a central control station and transmitted by a modulated laser beam through a distribution network in a floor covering and into the audio-visual reproducing devices on a student learning station that is movable on the floor covering.

Coupled with each of the foregoing systems of transmitting audio and video information to the student learning station are systems for transmitting selector signals from the student station to the central control station which enables the student to call up the desired information channels to his learning station.

Other objects, advantages and features of our invention will become apparent from the following detailed description taken in conjunction with the drawings in which:

FIG. 1 is a view in perspective showing a typical arrangement of an educational system embodying the principles of the present invention;

FIG. 2 is a block diagram of our educational system shown in FIG. 1;

FIG. 3 is a view in perspective showing one form of a coupling of the transmission facility from the central control station to the floor covering of the classroom;

FIG. 4 is an exploded view in perspective and in section showing one form of the coupling between the floor covering of the classroom and a student learning station;

FIG. 5 is an exploded view in perspective and in section showing a penetration type of coupling between the classroom floor covering and a student learning station;

FIG. 6 is an exploded view in perspective and in section showing an electromagnetic coupling between the central control station and the floor covering in a classroom;

FIG. 7 is a view in perspective and in section showing an electromagnetic coupling between the classroom floor covering and a student learning station;

FIG. 8 is a view in perspective showing an educational system according to the present invention utilizing glass fiber bundles as an information transmission facility;

FIG. 9 is a block diagram and schematic plan view showing schematically an educational system embodying the principles of the invention and utilizing a laser type transmission system;

FIG. 12 is a fragmentary view in cross section showing a portion of a form of laminated floor covering embodying the principles of the invention with a microwave coupler shown in place;

FIG. 13 is a fragmentary view in cross section showing the floor covering of FIG. 12 with a penetrating coupler probe for use when laser waves are the transmission medium.

Figure 10:
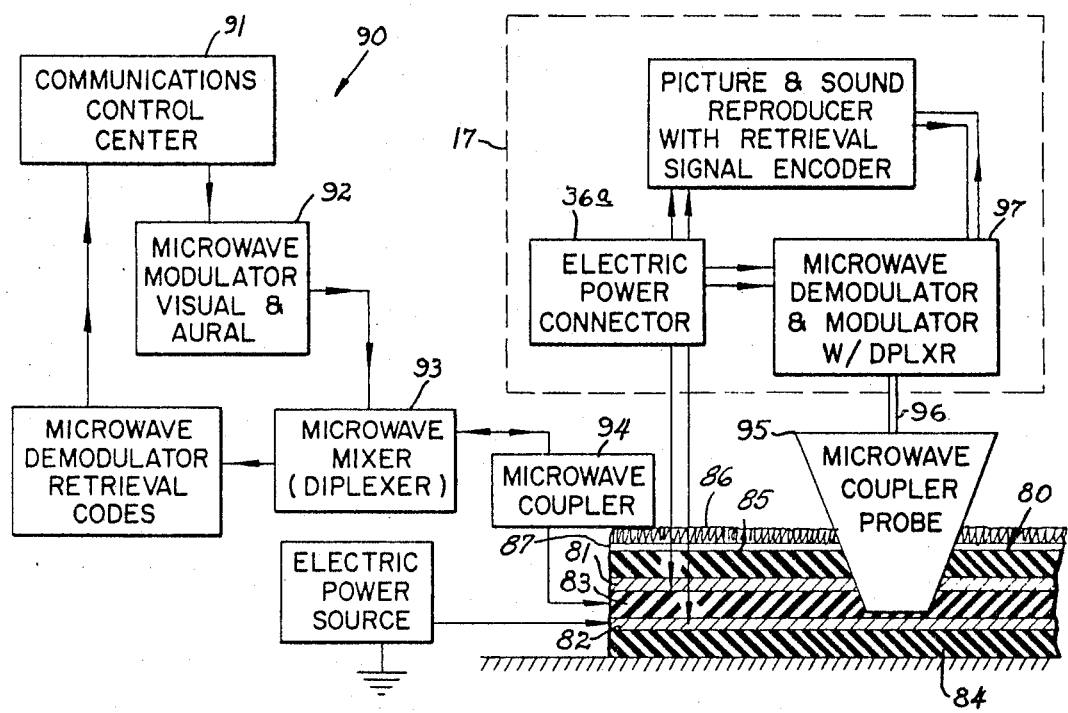
FIG. 10 is a block diagram of an information dissemination system according to our invention and utilizing a microwave transmission system.

With reference to the drawings, FIG. 1 shows a somewhat schematic representation of an information distribution system 10 embodying the principles of the present invention, as it would appear in the form of a classroom installation for a school or the like. In broad terms, the system comprises a central information control and distribution center 11 which preferably is in a separate room where educational material can be reproduced and transmitted in the form of video or audio signals. This control center is connected by means of a suitable transmission facility 12 such as standard electrical conductors or coaxial cables to any number of localities within the building such as the classroom 13, as shown. At the classroom where the students are located and the teaching takes place, the transmission facility is connected to a distribution grid or network 14 which is located in the upper layer 15 of the classroom floor or within a covering thereon. This distribution system within the floor or its covering affords a large plurality of outlets 16 which may be spaced apart and arranged in any predetermined pattern thereon. Supported on the floor covering within the classroom and thus on the distribution network are a plurality of student learning stations 17.

Each learning station serves as a carrel for an individual student and provides his complete needs within the system 10. Although these learning stations may take various forms, each essentially is a combination seat and desk type device comprising a supporting chair portion 18 with legs 19 and a desk portion 20. Mounted on each station device 17 is a video receiver 21 and an audio speaker 22 which are adapted to reproduce the information signals that are transmitted from the central information center 11 through the distribution grid network. Each learning station is provided with a suitable coupling device 23 which cooperates with a mating coupling means at the outlets 16 to admit from the distribution grid network the appropriate information signals that are then displayed by the video receiver of the student station and/or radiated as acoustic power by its audio receiver. Since the information distribution center 11 is capable of transmitting both video and audio information on several channels simultaneously, it can thereby provide different educational material to a number of study stations. Accordingly, each study station is provided with appropriate controls and selector switches so that a student can select any one of the several information channels available and thereby receive the desired presentation from the information center. Because of the compact arrangement of the student learning station each is a separate unit which can be operated in fairly close proximity to other such units without disturbing other students. Thus, these student learning stations offer a unique flexibility for utilizing various teaching techniques and procedures. They can operate as independent units to suit the needs of individual students, or they can be moved into groups of any size which select the same audio-visual material on their receivers.

The block diagram of FIG. 2 is representative of the generalized system described above. The information distribution device 11 includes transmitter and selector control equipment and generates the audio-visual signals which are carried by the transmission facility 12 to the classroom 13. At the classroom this transmission facility is coupled to the classroom floor covering or layer by means of a suitable coupling device 24. Since the distribution network 14 has a large number of outlets 16 spaced at preselected intervals, each student station can be moved to any convenient location on the classroom floor as long as its pickup coupling 23 coincides with an outlet coupling 16 in the floor covering. The upper floor layer or covering 15 is an important feature of our system, and it may have various constructions within the scope of the invention. For example, it may be a flexible linoleum-like material or it may be a woven fabric or carpetlike material. The latter is a material that is used with increasing frequency because of its ability to reduce noise and to provide an atmosphere conducive to good educational receptivity. Moreover, it is particularly adaptable for use with the present system because carpet materials afford a convenient means for retaining the signal distribution network.

In the embodiments of the invention shown in FIGS. 1-4, 6 and 7, the audio-visual signals are transmitted electrically and the central information center 11 comprises a conventional closed circuit transmitter for either video signals or audio signals or both. Thus, the transmission line 12 may be a conventional coaxial cable or broad-band transmission line capable of carrying multichannel radio frequency program signals, similar to present commercial VHF and UHF broadcast channels. On any of these television channels, picture information with accompanying sound information may be transmitted, or just pictures without sound, or sound channels without pictures.

Within the floor covering or carpet for the classroom the broad-band transmission line forms the distribution network 14. Preferably, this network is completely embedded within the floor covering so that it is invisible from above the carpet surface. Within the carpet or floor covering the transmission line is woven into the prearranged grid or network pattern 14 that provides a multiplicity of the cable outlets 16 that are connected in parallel. These outlets are essentially flush with the carpet surface and are spaced apart at certain intervals. In some instances it may be preferable to coordinate the position of the outlets with respect to a certain color pattern on the rug surface so that they are less noticeable and do not detract from its overall appearance.

In the embodiment of FIG. 3 the transmission line 12 is connected to the floor covering 15 such as the carpet by a suitable contact coupling connector 24. The latter is comprised of a female portion 25, preferably fully embedded within the floor covering 15, and a male portion 26 attached to an end of the transmission line 12.

The outlets 16 for the distribution grid as shown in FIG. 4 are generally flat and thin so that they can also be embedded well within the carpet 15, and yet be readily connected to the mating connector 23 on the student learning station 17. In the form shown, the male connector 23 is fixed to the end of a supporting leg 19 of the learning station 17. The female connector member 16 embedded in the carpet has an annular conductor ring member 27 which is mounted on an insulating base member to which are connected a pair of leads 28 of the distribution network having one polarity. Spaced inwardly from the ring member is a centrally located and slightly higher stud 29 to which is connected a pair of leads 30 of the distribution grid having the opposite polarity. The lower end of the learning station leg 19 has a generally cylindrical shape and fixed to it is a conductive fitting having a flat annular conductor plate portion 31 adapted to engage the ring member 27, a central cylindrical cavity, and an upper tubular section 32 that extends upwardly into the leg 19. An insulating inverted cup member 33 fits tightly inside the central cavity and has its own cavity conforming to the shape of the stud 29. Within the leg of the study station are a pair of leads 34 and 35 which form a coaxial cable that is connected to the video and audio receivers of the learning station. One lead 34 is connected to the annular plate member 31 and the other lead 35 forms a terminal at its end within the cup member 33 which is adapted to contact the stud 29 of the female coupler 16. While the foregoing describes one form of direct connecting coupler it is to be understood that other such couplers could be used within the scope of the invention. In all such direct coupling arrangements provisions for electrical impedance matching and for compensation of voltage attenuation can be provided by application of principles well known to those skilled in the art.

Each learning station 17 is furnished with power for operating the video and audio receiver and other teaching apparatus it may have, either from its own batteries or by another connection from it to a suitable remote power source. Or, power may be supplied through the floor covering 15 in a manner similar to that previously described with respect to information signal energy.

Two basic arrangements may be incorporated in the carpet for conveying power, one using direct current (D.C.), the other using alternating current (A.C.). Both can utilize relatively low voltages, that is, less than approximately 25 volts; or higher voltages in the order of 120 volts can be used, the only differences being the insulation requirements and the resultant current carrying capacities. The A.C. arrangement can utilize either the standard 60 cycles per second or the higher frequencies of 400 or 1200 c.p.s. commonly used in aircraft power systems.

Energizing the floor covering or carpet 15a with power to operate the student learning station can be accomplished by a direct coupling in a manner similar to the signal transfer coupling devices such as described previously and shown in FIG. 3.

An example of one form of a coupling for transferring power between a learning station and a floor covering is shown in FIG. 5. In this embodiment, the floor covering 15a is made up of laminations of conductive and insulating materials and a power coupling member 36 of the learning station is capable of making the necessary electrical connections when it penetrates the floor covering. As shown, the floor covering 15a has two conductive layers 38 and 39 separated by an insulating layer 40. A pair of top and bottom layers 41 and 42 of insulating material are adjacent to the upper and lower conductive layers, respectively. Bonded to the upper insulating layer 41, we may provide a layer 43 of carpet or some other eye appealing and penetrable composition material. The connector 36 which may be attached to the study station by an umbilical cable 44 or enclosed within a supporting leg 19 is the penetrating type comprised of concentric cylindrical shells of conductive and insulating material whose ends are exposed along the lower end of the connector. The central cylindrical portion 45 is preferably of a relatively hard conductive material and has a sharp lower end that will enable it to penetrate the floor covering easily. Surrounding the center portion is a shorter insulating layer 46 and then an even shorter conductor 47 and finally a still shorter outer insulating layer 48. The latter is integral with a circular top 49 that extends outwardly from the outer layer. A pair of leads 50 and 51 for the conductors 38 and 39 carry the electrical energy from an external source to the edge of the carpet. Output leads forming the cable 44 extend from contacts at the upper end of the connector through the top portion 49. When the connector 36 is installed it is merely pressed into the floor covering 15a until its top portion 49 is flush with the carpet surface. At this position, the normally exposed end of the counductor 45 will be buried within and contact a lower conductive layer 39 of the floor covering and the exposed end of the conductor 47 will be buried within the intermediate conductive layer 38. The conductive layers of the multilayer floor covering 15a may be made from a variety of conductive materials such as metallic foil or a woven mesh or screen of fine metallic wires or conductors. For some coverings we may use conductive layers formed by current carrying granular material such as graphite and metallic powders held together by a suitable binder. The insulating layers 40, 41, and 42 may be of any suitable nonconductive material such as a flexible sheet of plastic or an insulating fabric of natural or synthetic fiber or yarn.

Suitable automatic voltage regulators (not shown) may be incorporated in the reproducer devices at each student learning station to accommodate variations of the supply power.

In another embodiment of our invention shown in FIGS. 6 and 7 the coupling of the transmission line 12 to the floor covering 15 and from the latter to a student learning station 17 is done electromagnetically. This eliminates any need for connectors that physically engage each other and for connector members that are exposed on the surface of the floor covering or carpet. Such electromagnetic coupling is provided by coupling or split-core transformers which are buried within the floor covering and in a portion of the learning station that contacts the floor covering. These transformers utilize highly refined cores such as ferrite cores wound with wire to produce the desired transfer characteristics. As shown in FIG. 6, the coupler 24a for coupling the transmission line 12 to the floor covering 15 comprises a pair of transformer cores 52 and 53 which are oriented directly opposite each other when the floor covering is properly installed. The winding 54 on the core 52 is connected to the transmission line 12 and the winding 55 on the core 53 is connected to the distribution network leads 14 within the floor covering 15. The transformer 52 on the transmission line is preferably fixed near the periphery of a classroom and the transformer core 53 is embedded within the floor covering at some convenient location along its periphery so that it can lie adjacent to the transformer 52 in a normal installation.

Within the floor covering such as a woven carpet the distribution network 14 is provided in a predetermined pattern, as previously described. However, instead of the exposed connectors, a core 56 forming one half of a coupling transformer, as represented in FIG. 7, is enclosed in a winding 57 which is connected to a lead forming part of the network 14. This core 56 is buried completely within the floor covering 15 and is therefore not visible. However, the upper surface of the floor covering may be marked in such a fashion as by the carpet design to indicate the locations of each of the electromagnetic couplers buried within it. In this embodiment each learning station 17 has an electromagnetic coupler comprised of a core 58 which is preferably installed completely within one of its supporting legs 19 or which is otherwise attached to it. A winding 59 on the core 58 is connected to a circuit that includes the video and audio receivers for the station along with a signaling channel used by the student for selecting the desired information at the central control station. Thus, it is seen that in this embodiment each student learning station 17 can be moved freely about the classroom and whenever it is positioned over a marked location of a buried electromagnetic coupler 56 within the floor covering, it will receive the video and audio signals being transmitted from the control center 11, and, when necessary, it will convey the selector signal back to the control center.

In yet another embodiment of our invention shown in FIG. 8, visual information channels are established through a floor covering 15b such as carpeting by a transmission phenomenon commonly referred to as "fiber optics." Here, the source of pictures is in the form of light patterns generated or originated at the audio-video central control location 11b. The picture to be transmitted may be introduced by a picture projector 59 into a bundle 60 of glasslike fibers at a transforming unit 61. The latter is connected to a cross section of the ends of the fiber bundle, the extension of which forms a transmission line. At this transforming unit the light images from the picture projector are broken down geometrically into a number of very small parts of the whole image with the cross-section end of the bundle being placed in front of the image dividing elements so that each incremental part of the total image is transferred to an individual filament of the fiber optic bundle. This individual filament then carries that part of the entire image to whatever location it is physically directed. The shape of the bundle of filaments 60 in cross section can be varied to meet specific requirements. For example, a bundle of filaments when grouped together to pick up the original image may be in the form of a rectangular cross section, but in carrying the incremental images to another location the filaments can be laid side by side so that the bundle then would be in the form of a ribbon 63 which could be embedded within a floor covering material such as a carpet. In some instances, the fibers may be spread out and woven into the carpet as individual filaments. When the bundle 60 of filaments is brought together at a location where the image is to be reproduced, they must again be grouped into a rectangular cross section and in the same orientation as the original cross section of the fiber bundle when the image was placed on the filaments.

In the arrangement shown in FIG. 8, the bundle of filaments 60 (transmission line) from a central audio-visual station 11b is coupled by means of a flat optical connector 62 at the perimeter of the carpet 15b to a similar bundle or ribbon 63 of filaments which may be woven directly into the carpet. At spaced apart locations along these distribution bundles 63 which are within the carpet, flat optical transformer connectors 64 are provided which provide a means for transferring audio-visual information from the carpet to a student learning station, and also a selector signal from the student station back to the control center. An optical coupling device 65 which can be aligned with a flat optical connector is connected to a reproducer unit 66 on the desk 20 of a student learning station having a display viewer 68, which furnishes the viewer with the flow of visual information from the distribution bundle 63.

The audio information associated with the picture information in this embodiment of our invention may also be carried through a filament in the form of a modulated light wave. A sound light-beam modulator 67 for sending the audio signals is provided at the control center. At the learning station the audio modulated light wave is converted by a demodulator unit 68a within the reproducer unit 66 to an audible signal and is reproduced for the listener in the same manner as described for the radio frequency distribution system.

This same method of transferring information for the audio channel can be used in conjunction with a selector control 69 on the reproducer unit 66 for sending coded information back form the student learning station 17b to the audio-video control center 11b, thereby enabling the student to select the particular information desired. This control is operable in combination with a selector light beam detector 70 at the control center to provide the information selection feature.

Aside from the advantage that the fiber optic bundle can be woven into the carpet structure it has another unique feature in that it can convey different colored light images as well as monochrome or ordinary black and white images.

Still another method by which information can be carried through a floor covering 15c, as shown in FIG. 9, in accordance with the principles of the present invention is by means of a transmission system commonly referred to as laser transmission. In a very general way laser transmission can be compared with radio frequency transmission because laser waves are similar to radio waves. Laser waves, like radio waves, are continuously oscillating waves referred to otherwise as coherent light waves and in this regard are similar to radio waves. This permits them to have information superimposed on them in a manner similar to placing information on radio waves and likewise the information that is superimposed on them can be derived and reproduced by a detection device so that the wave itself then becomes a carrier of information from an interrogated source or an initiation source to a destination where that source is to be reproduced.

Since laser waves are such extremely high frequencies, they are capable of carrying a very great number of individual information channels which are separable by means of frequencies selection. Also, since laser waves behave as light waves they can be handled as light energy through the weave of a carpet in a manner very similar to that previously described with respect to the conveyance of light images by fiber optics. Thus, a floor covering or carpet may be provided with interwoven filaments of glass rods to convey the laser waves or the carpet may be provided with a sheet of laminated plastic that could be used as an undercovering to the top carpet surface.

The block diagram of FIG. 9 illustrates an embodiment of the present invention which employs laser transmission from a central control station 11c through the floor covering 15c and into a student learning station 17c. As shown, a laser beam modulator 71 providing both audio and visual signals to a laser beam is located at the central transmission station and is connected to a beam splitter 72. A selector and detector device 73 is connected to the beam splitter to provide selection of the transmitted information. The output of the beam splitter 72 is fed to a transmission tube 74 which extends between the central transmission station and the classroom. At the classroom the transmission tube is coupled by means of a coupler 75 similar to that employed for the fiber optics to the floor covering 15c of the classroom. Within the floor covering is a distribution line 76 capable of transmitting a laser beam interconnecting a plurality of spaced apart outlets 77, each one of which is capable of accommodating a student study station 17c. By means of a flat light transformer coupler 78 within the leg or attached to some other convenient portion of the student study station, an audio-visual reproducer and selector unit 79 on the study station is coupled to the distribution line 76 within the floor covering. The audio-visual reproducer and selector device can be controlled by a student at the learning station in a manner similar to the other previously described audio-video-signaling reproducer units.

In yet another form of our invention, a laminated floor covering or carpet material 80, shown in FIGS. 10 to 13, is provided which is capable of transmitting either laser waves, as previously described, or which can serve as a microwave transmission medium. In addition, it may also provide for the transmission of electrical power for use in operating study stations, as described above with respect to FIG. 5. In its broadest sense the floor covering 80, according to our invention, comprises a pair of spaced apart layers 81 and 82 of a suitable electrically conductive material. Such layers may be made from metal foil or woven metal strands, or particulate metal or conductive material bonded together to provide a flexible conductive sheet. The upper conductive layer 81 is used to establish an electric ground plane. These layers 81 and 82 may vary in thickness depending on the conductive material used and the particular application of the floor covering 80. Between the layers 81 and 82 we provide a layer 83 of dielectric or insulating material that spaces the conductive layers apart by some predetermined specific dimensional relationship, so that either laser waves or electromagnetic energy at microwave frequencies can be transmitted through the layer 83. This signal carrying layer 83 is preferably made of a light, flexible plastic such as any of the well-known foamed or clear plastic materials having low signal attenuation properties. Bonded to the lower conductive layer 82 is an insulating layer 84 that is preferably made of some flexible, non-inflammable plastic material. A layer 85 of similar material is bonded to the upper conductive layer 81 and provides a support structure to which a woven or tufted exterior fabric or carpet material 86 may be attached, either by bonding or other means. Between the exterior layer or carpet material 86 and the layer 85 a fluid sealing layer 87 is preferably provided. This latter layer may be a flowable or gummy type substance such as a relatively thin layer of partially cured rubber, as used in puncture proof tires, which will flow together to close holes that are made by penetrating signal sensing couplers during the use of the floor covering.

As stated, the floor covering material 80 may be used in an information dissemination system according to the present invention wherein the signal transmission medium is electromagnetic energy at microwave frequencies. Use of this medium makes it possible to transmit a large number of information channels from a transmission control center through a signal feed point at the periphery of a carpet or floor covering section.

Figure 11:
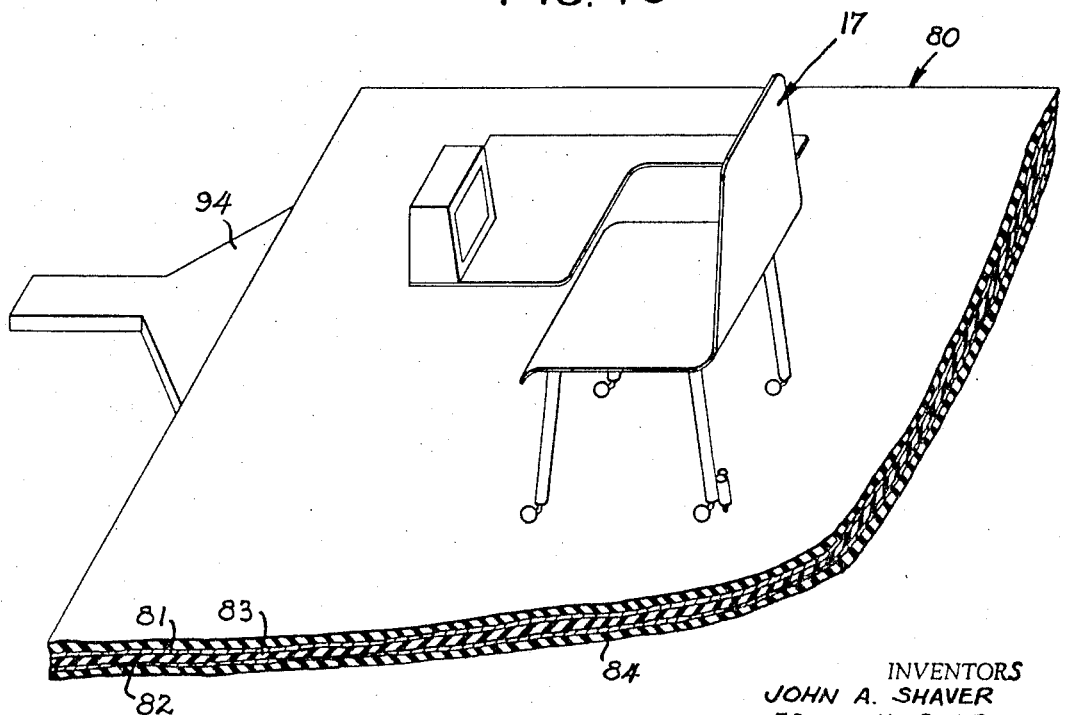
FIG. 11 is a fragmentary view in perspective showing a portion of floor covering embodying principles of the invention and a microwave coupler connected thereto.

A block diagram illustrating a microwave information dissemination system 90 embodying the principles of the invention is shown in FIG. 10. From a central communications control center 91 the preselected visual and/or aural information is sent to a microwave modulator 92 where it is put in the form of multichannel microwave signals. This electromagnetic signal information is fed to a microwave mixer or diplexer 93 and thence through a coupler device 94 that feeds the electromagnetic microwave signals into the floor covering 80. FIG. 11 shows how such a feed coupler may be attached to the edge of the floor covering. In the floor covering the conductive layers 81 and 82 function as wave guides which allow the microwave signals to be propagated throughout the floor covering. On the surface of the floor covering, receiving devices such as the study stations 17 heretofore described, are movable to any convenient location. Essentially, each is equipped with a microwave coupler probe 95 connected by a suitable wave guide transmission means 96 to a combined microwave demodulator and modulator 97 having a diplexer for handling both the received signals for use by the study station and also signals transmitted from the study station back to the control station 91. A suitable power connector 36a, such as the penetrating type connector 36 shown in FIG. 5, may be used to penetrate the floor covering 80 and provide power for operating the study station components including video and audio receivers, other teaching machines and a retrieval signal encoder for return transmissions. The various microwave components of the aforesaid system 90 may be of conventional construction according to known state of the art principles and for that reason and to conserve space are not described herein in detail.

The coupler probe 95, however, is shown in some detail in FIG. 12 since it provides a unique solution to the problem of transmitting the microwave signals from the floor covering to the study station while allowing the latter to be freely moved to any position on the floor covering. In the form shown, the probe comprises essentially a piece of metallic pipe 98 forming a hollow wave guide having the proper cross-sectional shape and size to be compatible with the wave length, frequency and mode of the electromagnetic microwave energy being transmitted through the floor covering. Near its lower end a metal rod or probe tip 99 projects into the center of but is insulated from the wave guide 98 or resonant cavity. The probe tip 99 is used to provide the necessary coupling to the external circuitry of the study station for the injection into or extraction of energy from the dielectric layer 83 between the conductive layers 81 and 82 of the floor covering 80. The lower end of the probe tip 99 extends below the wave guide section of the coupler and is encased in a relatively hard dielectric plastic material 100 that protects the probe tip and keeps it centered while enabling the entire coupler probe 95 to be forced into the floor covering each time the study station is moved to a new location on it. At its upper end the wave guide is attached in some suitable manner to the study station 17 and is connected to the wave guide plumbing which leads to the demodulator and modulator unit. Various arrangements may be made for this plunger, and the one shown in FIG. 12 is merely illustrative. Here, the wave guide pipe 98 is fixed within a foot operated plunger 101 that is movably mounted within a plunger body 102a attached to the leg 19a of a study station 17a. A suitable stop means such as a flange 103 on the wave guide pipe automatically positions the probe tip within the dielectric layer 83 when the flange 103 bears against the floor covering surface. The upper end of the wave guide pipe is attached to a flexible signal conductor or wave guide transmission means 96, such as the metallic bellows type. Preferably this extends upwardly through a cavity in the leg 19 to the modulator and demodulator unit 97.

A plunger type coupler 105 for a laser transmission system may be utilized with the floor covering 80 and also with a laser modulator-demodulator unit connected to audio and video receivers in a study station or the like as previously described with reference to FIG. 9.

The last plunger coupler 105 comprises a solid rigid rod made of relatively hard clear plastic or glasslike material similar to material sold under the trademark Lucite. As shown in FIG. 13, the rod may be fixed in a movable plunger 106 which is mounted within a plunger body 102b. At its upper end the rod is connected to a flexible light wave conductor 107 of plastic or glass fiber material that preferably extends within the leg of a study station to the laser modulator-demodulator (not shown in FIG. 13). At its lower end, which is adapted to penetrate the floor covering 80, the plunger coupler 105 has a front surface 108 facing the source of laser energy entering the floor covering that is beveled at an angle to the longitudinal axis of the rod. From the lower tip of the rod 105 which is the lower edge of the beveled surface a curved rear surface 109 extends upwardly. A frontal surface 110 above the front beveled surface 108 and the curved surface 109 are both coated with a layer 111 of metal material that serves as a focusing reflector. A suitable stop such as the flange 103 also serves here to position the beveled surface of the rod 105 within the dielectric layer 83. Thus, the laser energy striking the beveled 108 end of the rod 105 in the dielectric layer 83 of the floor covering 80 enters the probe only at this beveled surface. It impinges on the curved surface 109 whose curvature is such to reflect the energy directly upward through the plunger and thence through the conductor 107 to the demodulator of the particular study station.

It is apparent that for the best reception the beveled surface 109 should be directed towards the input source of light energy entering the floor covering. To provide the adjustment to take care of this directional factor the rod 105 may be rotatable once it is inserted into the floor covering and thus the maximum signal can be received despite the position of the study station.

Other forms of penetrating couplers may be used for the foregoing embodiments of FIGS. 10–13 and the plunger type arrangement shown is merely one illustration of a workable structure.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:
1. An information dissemination system adapted for installation in a building or the like comprising in combination:
   a central control station for transmitting one or more channels of audio and visual information signals;
   a classroom in said building for accommodating a plurality of students;
   laminated floor covering means providing within it as laminations thereof an information distribution network and covering the floor area of said classroom;
   a transmission means interconnecting said central control station and said distribution network;
   input coupling means for conveying said information signals from said transmission means to said signal distribution network;
   a plurality of student learning stations supported by and freely movable on the floor covering means of said classroom and on said distribution network, each student station having means for random coupling with said distribution network to receive audio and visual information signals therefrom;
   and means on said student learning station for amplifying the audio information signals and for providing a visual display of said visual information signals.

2. The system as described in claim 1 including means on said student learning station for sending return signals back to said central office station to select the information signals desired to be received by the learning station.

3. An educational system adapted for installation in a school building or the like comprising in combination:
   a central control station for transmitting one or more channels of information signals;
   a classroom having a floor in said building for accommodating a plurality of students;
   a laminated floor covering on the floor, some laminations thereof providing an information distribution network within said floor covering of said classroom;
   a transmission means interconnecting said central control station and said distribution network;
   input coupling means for conveying said information signals from said transmission means to said signal distribution network;
   a plurality of student learning stations supported by and freely movable on the floor of said classroom and on said distribution network, each student station having means for random coupling with said distribution network laminations to receive and send information signals therefrom;
   means on each said student learning station for receiving and converting the information signals to either an audio or a visual presentation, and
   means on each said student station for sending coded signals to the central control center for selecting desired information channels.

4. The system as described in claim 3 wherein said transmission means is a bundle of glasslike fibers; a flexible covering on the floor of said classroom; and a plurality of bundles of glasslike fibers within said classroom arranged in a predetermined pattern to form said distribution network.

5. The system as described in claim 4 including an optical transformer-coupler on each said student learning station for extracting and reproducing both audio and visual information from said distribution network and for transmitting selector signals back to said central control station.

6. The system as described in claim 3 wherein said central control station includes means for generating a beam of high frequency coherent light waves; a modulator means for imposing both audio and visual signals on said beam being transmitted; and means on each said student learning station for demodulating the signals on a received beam and for providing audio and visual information derived therefrom.

7. The system as described in claim 6 including a signal generator at each student station for transmitting selector information back to the central control station.

8. A system for disseminating information from a central source to a plurality of receiving stations comprising in combination:
   a central control station for transmitting one or more channels of audio and visual information signals;
   a room remotely located from said control station;
   a transmission means interconnecting said central control station and said room;
   a laminated floor covering in said room and signal distribution means within the floor covering for carrying said information signals;

input coupling means for conveying said information signals from said transmission means to said signal distribution means within said floor coverings;

a plurality of receiving stations supported by and freely movable on said floor covering of said room, said receiving stations each having means for random coupling with said distribution means within said floor covering to receive information signals therefrom;

and means on each said receiving station for amplifying the information signals and for providing either audio or video reproduction thereof.

9. The system as described in claim 8 including means on said receiving station for sending return signals back to said central office station to select the information signals desired to be received by the learning station.

10. The system of claim 8 wherein said laminated floor covering includes power distribution means with input couplers therefor and said receiving stations have couplers for random coupling to the power distribution means.

11. The system as described in claim 8 wherein said signal distribution means comprises a wave signal propagating layer of dielectric material separating two conductive layers within said floor covering; and a coupler probe on each said receiving station for penetrating said floor covering and receiving signal energy within said dielectric layer.

12. A system for disseminating information from a central source to a plurality of receiving stations comprising in combination:

a central control station, including an information signal generating means, a microwave modulator and a demodulator both connected to a microwave mixer, for transmitting a plurality of channels of microwave signal energy for both audio and visual reproduction;

a room remotely located from said control station;

a microwave transmission means interconnecting said central control station and said room;

a floor covering in said room including integral signal distribution means within the floor covering for carrying said microwave signal energy;

input coupling means for conveying said information signals from said transmission means to said distribution means within said floor coverings;

a plurality of receiving stations supported by and freely movable on said floor covering of said room, said receiving stations each having coupler probe means for coupling with said distribution means within said floor covering to receive microwave signal energy therefrom;

and means on each said receiving station, including a microwave modulator and demodulator means, for amplifying the microwave signals and reproducing them in either audio or video form.

13. The system as described in claim 12 including a signal encoding means on each said receiving station; means for transmitting microwave signals from each said receiving station through the floor covering to the central control station; and microwave demodulation and signal retrieving means at said central control station for decoding signals from various receiving stations.

14. A system for disseminating information from a central source to a plurality of receiving stations comprising in combination:

a central control station, including an information signal generating means, a microwave modulator and a demodulator both connected to a microwave mixer, for transmitting a plurality of channels of microwave signal energy for both audio and visual reproduction;

a room remotely located from said control station;

a microwave transmission means interconnecting said central control station and said room;

a floor covering in said room including distribution means within the floor covering for carrying said microwave signal energy and electrical power;

input coupling means for conveying said information signals from said transmission means to said distribution means within said floor coverings;

a plurality of receiving stations supported by and freely movable on said floor covering of said room, said receiving stations each having coupler probe means for coupling with said distribution means within said floor covering to receive microwave signal energy and power therefrom;

and means on each said receiving station, powered by said distribution means through said probe means, including a microwave modulator and demodulator means, for amplifying the microwave signals and reproducing them in either audio or video form.

15. A system for the dissemination of information, comprising:

a room having a floor;

a laminated floor covering on said floor having within it distribution laminations for carrying electromagnetic energy over a substantial area of the room;

a central station electrically connected to said floor covering distribution means; and a plurality of freely movable learning stations resting on said floor covering including random coupling means for substantially instantaneously coupling and uncoupling each said distribution lamination for connection with energy transmitted between said central station and said learning stations through said floor covering.

16. A school system, comprising:

a continuous laminated floor covering having integral electromagnetic transmission means as at least one continuous lamination thereof;

a plurality of freely movable learning stations with electromagnetically operated study aids;

and means for random coupling of each said learning station to said transmission means.

References Cited

UNITED STATES PATENTS

| | | |
|---|---|---|
| 2,798,172 | 7/1957 | Jones. |
| 3,233,346 | 2/1966 | Cornberg _____ 35—35 XR |
| 3,288,912 | 11/1966 | Hussey _____ 174—70 |

EUGENE R. CAPOZIO, *Primary Examiner.*

W. GRIEB, *Assistant Examiner.*